US012785852B2

(12) United States Patent
Bernard et al.

(10) Patent No.: US 12,785,852 B2
(45) Date of Patent: Nov. 3, 2026

(54) ERROR CORRECTION FOR HIGH-SPEED OPTICAL NETWORKS

(71) Applicant: Calix, Inc., San Jose, CA (US)

(72) Inventors: Christopher Thomas Bernard, Minneapolis, MN (US); Scott Notch, Hanover, MN (US); Dylan Ethen, San Jose, CA (US)

(73) Assignee: Calix, Inc., San Jose, CA (US)

( * ) Notice: Subject to any disclaimer, the term of this patent is extended or adjusted under 35 U.S.C. 154(b) by 344 days.

(21) Appl. No.: 18/653,674

(22) Filed: May 2, 2024

(65) Prior Publication Data

US 2025/0343623 A1 Nov. 6, 2025

(51) Int. Cl.

| | |
|---|---|
| ***H04B 10/60*** | (2013.01) |
| ***H04B 10/079*** | (2013.01) |
| ***H04L 1/00*** | (2006.01) |
| ***H04L 25/49*** | (2006.01) |

(52) U.S. Cl.

CPC ....... *H04L 1/0045* (2013.01); *H04B 10/0795* (2013.01); *H04B 10/60* (2013.01); *H04L 25/4917* (2013.01)

(58) Field of Classification Search

CPC .... H04B 10/69; H04B 10/693; H04B 10/801; H04B 14/004; H04L 1/0045; H04L 27/34; H04L 27/02; H03K 9/02

See application file for complete search history.

(56) References Cited

U.S. PATENT DOCUMENTS

| | | | | |
|---|---|---|---|---|
| 8,675,754 | B1 * | 3/2014 | Yonge, III | H04L 5/12 375/261 |
| 11,671,281 | B1 * | 6/2023 | Shrikhande | H04L 12/4633 370/252 |
| 2010/0232495 | A1 * | 9/2010 | Citta | H03M 13/00 375/E7.026 |
| 2011/0129235 | A1 | 6/2011 | Le et al. | |
| 2016/0277113 | A1 * | 9/2016 | Riani | H04L 27/02 |
| 2019/0190651 | A1 * | 6/2019 | Oveis Gharan | H04L 1/0041 |
| 2019/0280809 | A1 * | 9/2019 | Cho | H04L 25/03343 |
| 2020/0195353 | A1 * | 6/2020 | Ye | H04B 10/272 |
| 2020/0220654 | A1 * | 7/2020 | Jang | H04L 1/0042 |

(Continued)

OTHER PUBLICATIONS

"International Application Serial No. PCT US2024 029781, International Search Report mailed Jan. 21, 2025", 3 pgs.

(Continued)

*Primary Examiner* — Tanya T Motsinger

(74) *Attorney, Agent, or Firm* — Seager, Tufte & Wickhem, LLP

(57) ABSTRACT

Systems and techniques for are described herein. An optical signal is received and the optical signal is converted into an electrical signal. The electrical signal is amplified through a trans-impedance amplifier to produce an amplified signal. The amplified signal is normalized using a limit amplifier to generate a normalized signal. Bit values are determined from the normalized signal and a corresponding probability bit is generated for each bit value using a threshold detector. The bit values and the corresponding probability bit are encoded into a four-level pulse-amplitude modulation (PAM-4) signal. The PAM-4 signal is transmitted to an application-specific integrated circuit (ASIC) for data recovery and error correction processing.

20 Claims, 7 Drawing Sheets

(56) References Cited

U.S. PATENT DOCUMENTS

| | | | | |
|---|---|---|---|---|
| 2021/0058160 | A1 | 2/2021 | Rope et al. | |
| 2021/0243058 | A1* | 8/2021 | Doan | H04L 1/0042 |
| 2022/0039231 | A1* | 2/2022 | Yeh | G09G 3/32 |
| 2022/0075239 | A1* | 3/2022 | Cho | G02F 1/383 |
| 2022/0103261 | A1* | 3/2022 | Di Mola | H04B 10/40 |
| 2022/0190931 | A1* | 6/2022 | Strobel | H04B 10/5167 |
| 2022/0201225 | A1* | 6/2022 | Riani | H03M 13/1515 |
| 2022/0345352 | A1* | 10/2022 | Yi | H04L 1/0042 |
| 2023/0018578 | A1* | 1/2023 | Bakopoulos | G02F 1/2257 |
| 2024/0305510 | A1* | 9/2024 | Seol | H04L 1/0047 |
| 2025/0038883 | A1* | 1/2025 | Strobel | H04L 1/0045 |
| 2025/0343623 | A1* | 11/2025 | Bernard | H04B 10/524 |
| 2026/0139939 | A1* | 5/2026 | Lee | G01B 7/30 |
| 2026/0142750 | A1* | 5/2026 | Strobel | H04L 1/0045 |

OTHER PUBLICATIONS

"International Application Serial No. PCT US2024 029781, Written Opinion mailed Jan. 21, 2025", 4 pgs.

* cited by examiner

ERROR CORRECTION FOR HIGH-SPEED OPTICAL NETWORKS

TECHNICAL FIELD

Embodiments described herein generally relate to optical data networks and, in some embodiments, more specifically to improved error correction for high-speed optical networks.

BACKGROUND

High-speed optical networks are increasingly reliant upon forward error correction (FEC) to achieve error free operation on increasingly errored physical links. While FEC has always been present, recent standardization relies upon soft-decision algorithms which add not only the sampled bit but also a probability bit into the algorithm. The probability bit (or bits) are either the raw sample of the A/D converter, or an indication of the confidence/probability of a correct sample. The more bits that are sent for the soft-decision result in a more accurate decoder at the expense of more logic and computation. Most of the SD-FEC coding gain can be realized with a single decision bit and for practical purposes the remainder of this invention disclosure will assume that. Hard decision FEC (HD-FEC) uses only the sampled bit and parity when processing a codeword, Soft-Decision (SD-FEC) uses this sampled data and a one-bit per bit decision input when processing the codeword. Soft decision algorithms utilizing a single additional probability bit can achieve information coding gains of an additional dB when measured as optical receiver sensitivity improvement. The resulting bitstream from the receiver contains not only the sampled data at the physical layer rate, but an equal rate soft-decision bit. A 'I' may provide the FEC decoder with a high confidence of sampling, whereas a '0' may indicate low confidence. The FEC decoder uses the confidence bit to prioritize certain parts of the codeword for correction leading to the gain in error correction over a purely HD-FEC algorithm.

The SD-FEC probability bit generation is located within the analog receiver circuitry of the receiver and sent to the MAC ASIC for processing. The presence of an SD-FEC channel doubles the information being sent to the ASIC as the bitrate of the SD-FEC channel equals the bitrate of the PHY receive data. This invention disclosure addresses some problems that are foreseen when sending the SD-FEC channel to an ASIC over a pluggable optical module or on-board BOSA.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
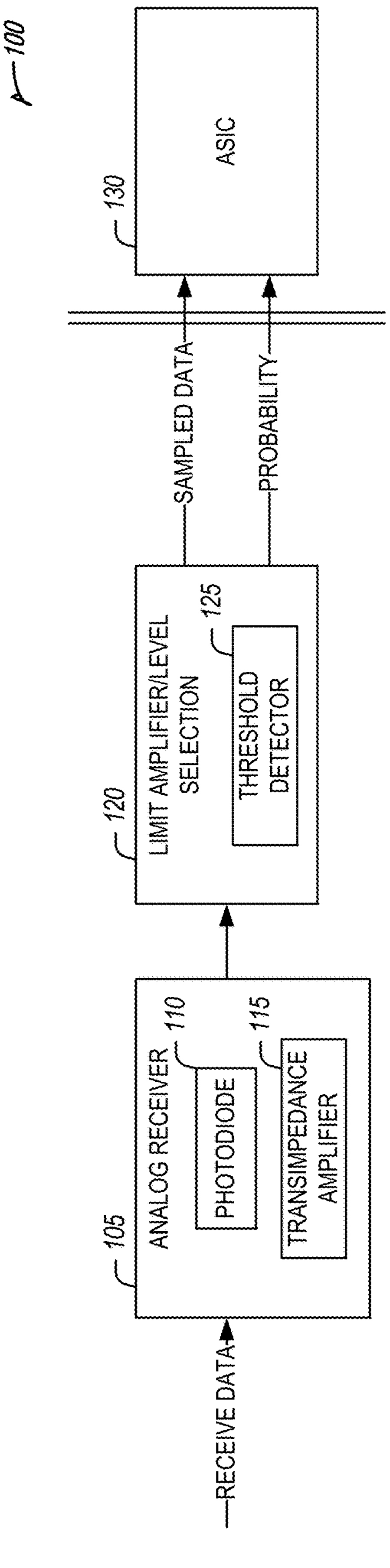
FIG. 1 is a block diagram of an example of an analog optical receiver.

FIG. 1 illustrates a block diagram of an example of an analog optical receiver 100. An analog receiver 105 is comprised of a photodiode 110 to convert the optical energy into a small amount of electric signal. From there the signal is sent to a transimpedance amplifier 115 to provide an input to a limit amplifier 120 which normalizes the signal level prior to sending to an application specific integrated circuit (ASIC) 130 (or printed circuit board (PCB), etc.). Within the limit amplifier 120 a threshold detector 125 is implemented which determines whether a current sample is a '1' or a '0'. If the decision is incorrect at this point, a bit error will occur that uses forward error correction (FEC) to correct. The threshold detector 125 notifies the FEC with a probability bit that allows a soft-decision algorithm to favor those bits that were on the edge compared to those that were confidently determined to be samples.

A number of problems arise when sending the probability bit to the ASIC 130 on a separate channel from the sample data. The first issue is how to control skew between the sampled data and the probability bit. The ASIC 130 receives both streams independently and bonds the channels bit for bit to prevent probability assignment association with the wrong sample. At very high speeds the skew would have to be controlled within pico-seconds. The second problem that arises is how to guarantee transitions on the probability bit. The sampled data is scrambled by a physical layer device (PHY) such that ample transitions occur for alternating coupled (AC) transmission to the ASIC 130 and clock recovery. The probability bit has no such guarantee of transitions and may not adhere to the consecutive-identical-digit requirements of the ASIC 130 receiver.

The systems and techniques discussed herein addresses the issues with sending the probability bit on a separate channel than the sample data is sent when using soft-decision FEC for fifty gigabit (50G) symmetrical passive optical network (PON) or future burst mode communication technologies that rely on the combination of a clock recovery and soft decision FEC. The task of bit-wise alignment between the data and soft-decision FEC interfaces is a complex problem. Soft-decision FEC interfaces can suffer from lack of direct coupling (DC) balance that may cause unintended miscues at the media access control (MAC) interface. As modules become more sophisticated, there becomes a need for a higher speed interface between module and MAC beyond the traditionally slow Inter-Integrated Circuit (I2C) bus.

The solution discussed herein solves technical challenges of robust implementation of soft-decision FEC in burst-mode configuration, reduces implementation complexity of correcting high speed data channel skew, eliminates a need for additional physical interfaces between a MAC and a module by utilizing available information dead-zones of a soft-decision FEC interface, and provides several advantages of such a high speed interface between the MAC and the module.

Technical challenges associated with implementing soft-decision FEC in high-speed optical communication systems are addressed, particularly for symmetrical 50G PON and burst-mode technologies. Complexity of correcting high-speed data channel skew is reduced and a need for additional physical interfaces between the MAC and the module is reduced. A high-speed interface is introduced for telemetry data that enhances real-time analysis and system monitoring.

Figure 2:
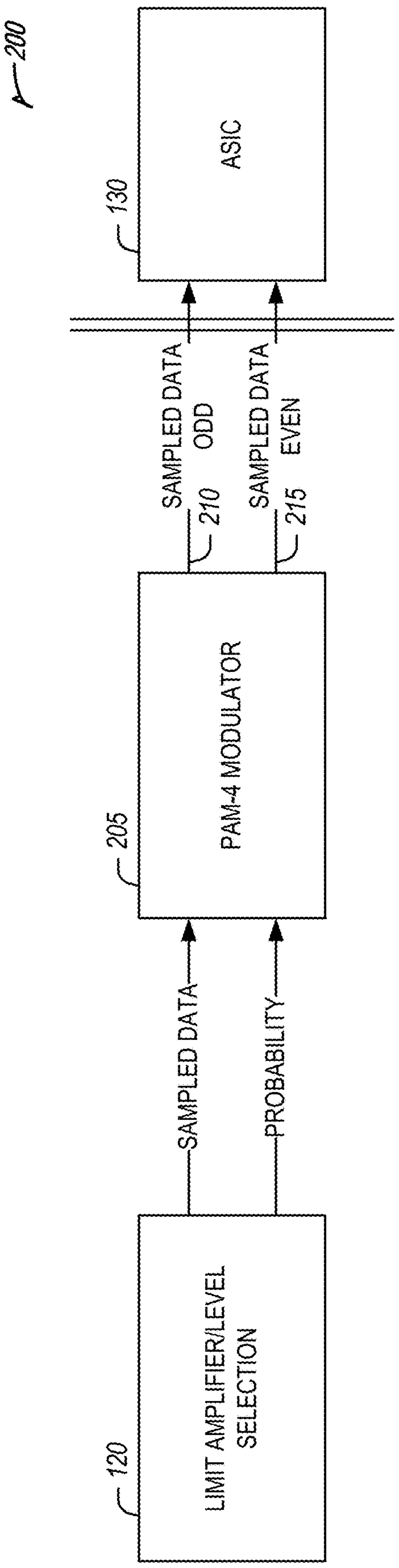
FIG. 2 is a block diagram of an example of utilizing four-level pulse-amplitude modulation (PAM-4) to bond sampled data and probability for, according to an embodiment.

FIG. 2 is a block diagram of an example of utilizing four-level pulse-amplitude modulation (PAM-4) to bond sampled data and probability 200 for, according to an embodiment. PAM-4 modulation is a technique to send 2 bits of information per sample by utilizing four signal levels and is used more and more frequently in optical sub-assemblies with traffic rates higher than 25 Gbs per channel. In a 50 Gbs optical receiver with a single receive data line, 2 bits of receive data are sent on a 25GBaud PAM-4. The systems and techniques discussed herein break the receive data into odd/even bits and encode the corresponding probability bit within a PAM-4 modulator 205. A first traffic lane 210 contains the odd bits and corresponding probability bits, while a second lane 215 contains the even bits and corresponding probability bits.

The first lane 210 and the second lane 215 are PAM-4 encoded which offers two advantages. First, the necessity for tight skew control is removed because the ASIC 130 has access to the preamble/delimiter values present on the signal such that each stream can be aligned and recombined within the ASIC 130. Second, the PAM-4 modulated signal carries already present transition density of the sampled data and does not require any special processing of the probability stream such as scrambling or delimiter duplication. Both the channel bonding and consecutive-identical-digit problem are solved with this technique.

There may be multiple mappings of SD-FEC and data bits to PAM-4 symbol. There are two variables each with two states when combining data and SD-FEC into a single PAM-4 symbol. For example, a data variable may have states of 1 or 0 and a SD-FEC variable may have states of High confidence or Low confidence. As a PAM-4 signal encodes two bits of information as a 4-level signal, for a PAM-4 electrical interface this can be thought of as weak positive, strong positive, weak negative, strong negative.

A Traditional PAM4 Differential Electrical Level Mapping is shown in TBL. 1.

TABLE 1

| Level | Level Description | Bitmap |
|---|---|---|
| Level 4: | strong positive | 11 |
| Level 3: | weak positive | 10 |
| ---Neutral--- | | |
| Level 2: | weak negative | 01 |
| Level 1: | strong negative | 00 |

An alternative PAM-4 Grey Code Mapping is shown in TBL. 2.

TABLE 2

| Level | Level Description | Bitmap |
|---|---|---|
| Level 4: | strong positive | 10 |
| Level 3: | weak positive | 11 |
| ---Neutral--- | | |
| Level 2: | weak negative | 01 |
| Level 1: | strong negative | 00 |

Whatever the bit mapping to level mapping, there may be certain combinations that may have benefits over others. For a high bit error rate (BER) received optical signal, a signal where a low confidence SD-FEC output is most likely, the BER presents itself in the PAM-4 signal as bit period jitter. This further complicates recovering the already more difficult PAM-4 electrical signal (vs a two-level signal) at the MAC. TBLs. 3 to 5 illustrate several examples that may be used in implementing the odd-even bit data channels. In the example shown in TBL. 3, the first bit is the data bit and the second bit represents the SD-FEC confidence.

TABLE 3

| Level | Level Description | Bitmap | Bitmap Interpretation |
|---|---|---|---|
| Level 4: | strong positive | 10 | 1 bit, with low confidence |
| Level 3: | weak positive | 11 | 1 bit, with high confidence |
| ---Neutral--- | | | |
| Level 2: | weak negative | 01 | 0 bit, with high confidence |
| Level 1: | strong negative | 00 | 0 bit, with low confidence |

In the example shown in TBL. 4, the first bit is the data bit and the second bit represents the SD-FEC confidence, but is inversely mapped compared to the mapping shown in TBL. 3. This alternative PAM-4 levelling system may be beneficial in high jitter environments.

TABLE 4

| Level | Level Description | Bitmap | Bitmap Interpretation |
|---|---|---|---|
| Level 4: | strong positive | 11 | 1 bit, with high confidence |
| Level 3: | weak positive | 10 | 1 bit, with low confidence |
| | ---Neutral--- | | |
| Level 2: | weak negative | 00 | 0 bit, with low confidence |
| Level 1: | strong negative | 01 | 0 bit, with high confidence |

In the example shown in TBL. 5, the first bit represents the SD-FEC confidence and the second bit is the data bit. This alternative PAM-4 levelling system may be beneficial in high jitter environments.

TABLE 5

| Level | Level Description | Bitmap | Bitmap Interpretation |
|---|---|---|---|
| Level 4: | strong positive | 10 | high confidence, 0 bit |
| Level 3: | weak positive | 11 | high confidence, 1 bit |
| | ---Neutral--- | | |
| Level 2: | weak negative | 01 | low confidence, 1 bit |
| Level 1: | strong negative | 00 | low confidence, 0 bit |

Figure 3:
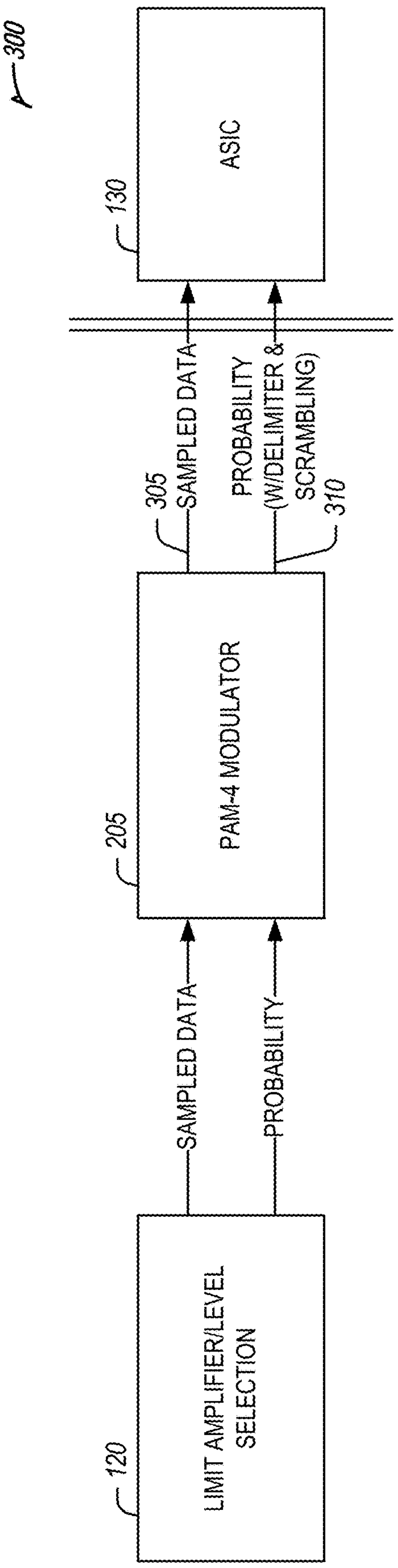
FIG. 3 is a block diagram of an example of duplicating a preamble/delimiter on a probability stream for, according to an embodiment.

FIG. 3 is a block diagram of an example of duplicating a preamble/delimiter on a probability stream 300 for, according to an embodiment. Duplicating the preamble/delimiter on the probability stream and scrambling the signal for transition density guarantees channel bonding between sample data and a probability stream. In this case, the sampled data is PAM-4 modulated (e.g., by the PAM-4 modulator 205 as described in FIG. 2, etc.) and contained within a first data stream 305. The corresponding probability bits are sent PAM-4 modulated as well but are additionally processed prior to transmission. First processing adds scrambling to guarantee transition density on a channel 310 between the PAM-4 modulator 205 and the ASIC 130. Second processing duplicates the preamble/delimiter from the sample data so that the ASIC 130 can detect and realign the probability bits to the correct data bits. The ability to add preamble/delimiter is a digital function using additional processing capabilities on the optical sub assembly.

Figure 4:
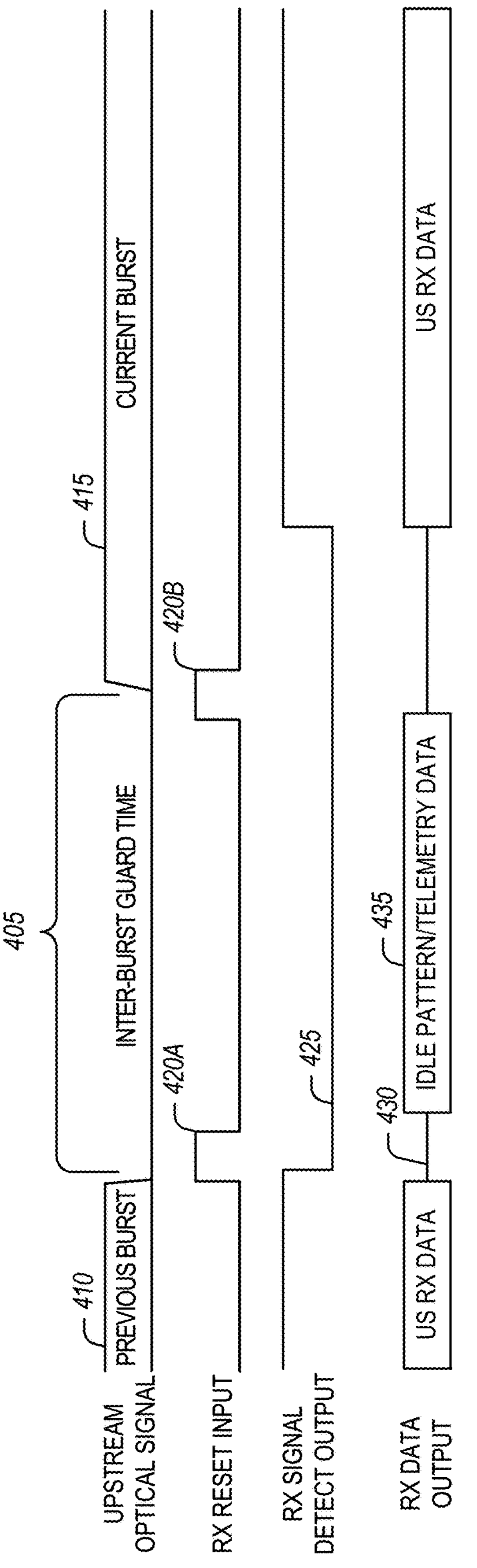
FIG. 4 is a block diagram of an example of using inter-burst guard time for real-time telemetry for, according to an embodiment.

FIG. 4 is a block diagram of an example of using inter-burst guard time 405 for real-time telemetry for, according to an embodiment. Modern burst-mode receivers utilize an electrical input known as a reset pulse (e.g., reset pulses 420A and 420B) to reset the coupling capacitors between upstream bursts for minimal inter-burst interference in optical signal reception. This settling period is used to reset any bias from a previous burst 410 in the analog electrical front-end. For higher speed systems, it is not uncommon for the receive (RX) reset pulses 420A and 420B to be sent at the end of the previous burst 410, and at the start of the next burst 415 to maximize neutralization of any biases. During the inter-burst guard time 405, the electrical data interface between modulator and ASIC is either squelched to a common mode voltage or noise driven. A challenge in PON optical line terminal (OLT) optics is energizing the interface immediately following the inter-burst guard time 405. Early generations of optical devices utilized DC coupling to enable fast settling times, but as PON signaling speeds increase, AC coupling is employed to preserve data bits signal integrity. AC coupled interfaces settle more quickly when constantly driven with DC balanced data.

The inter-burst guard time 405 between RX reset pulses 420A and 420B is utilized to maintain a DC balanced clocked data output 425 across RX data paths 430. Available high speed RX data path time is used to transmit telemetry data 435 between the optical interface and the ASIC over the data and soft-decision FEC probability bits. The transmission is initiated by the host ASIC asserting an RX reset pulse (e.g., reset pulse 420A, etc.) and terminated by the host device with a secondary RX reset pulse (e.g., reset pulse 420B, etc.). The host device may communicate the expected inter-burst guard time 405 between RX reset pulses 420A and 420B via a standard I2C interface used for low speed communication between host and optics.

A preamble/delimiter portion can be used for real-time telemetry. A burst-mode receiver sends a preamble/delimiter on the transmission data for the receive ASIC to properly recover and align the reception. The preamble/delimiter patterns received have no FEC coverage and therefore do not use the probability bit during this time. This also holds true for continuous mode downstream PON systems which utilize a 125 micro-second periodic delimiter pattern for alignment. The preamble/delimiter/physical-sync blocks that are outside of FEC processing are used to send the telemetry data 435 between the optical sub assembly and the ASIC on the SD-FEC probability bits. Unlike the typical method of making measurements and storing locally for later collection over I2C, this provides higher bandwidth and burst-for-burst aligned telemetry data 435. Examples of real-time burst-for-burst telemetry data 435 that could be sent to the ASIC for analysis on this new channel includes, by way of example and not limitation, a receive signal level of every burst, clock and data recovery (CDR) status for sub-assemblies with clock recovery, CDR time to lock for previous burst, phase interpolator values, limit amp gain selection, dispersion monitors, jitter measurement, optical time-domain reflectometer (OTDR) measurements, etc.

Dynamic structuring of real-time telemetry can be used for reduced sampling. Dynamic structuring of real-time telemetry addresses a problem wherein use of the preamble/delimiter patterns or receiver reset time implies variably sized probability bit blocks. Preamble and delimiter recommendations are offered with size and pattern characterizations within International Telecommunication Union (ITU) standards, but are ultimately left up to the implementer. The preamble and delimiter can be elongated or shortened based on optical distribution network (ODN) class or other transceiver/receiver classifications. Likewise, they can be variably sized depending on the PHY rate across different protocols. The aforementioned examples of burst-for-burst telemetry data 435 may not all fit within the bandwidth available during the preamble/delimiter probability bits of every burst.

Due to this implementation-specific dependency, the sampling rate for each telemetric data type may not match the burst/PHY rate and may instead require a reduced sampling rate. Therefore, a framing structure is used that offers a reduced sampling rate such that the telemetry can be retrieved, stored, and referenced in a manner that can be processed. The framing structure uses a header to maintain framing and data-type alignment, which consists of error correction as well as type and rate/iteration identifiers. The framing structure allows dynamic sampling control on a per-telemetry-element basis.

Artificial intelligence (AI) and machine learning (ML) engines can be used to process real-time telemetry. A resident telemetry engine is used to accumulate and process data near a per-burst rate. Traditional software read-back mechanisms require vast lookup registers and deep random access memory (RAM) interfaces. Maintaining the necessary array of data is difficult to manage and manipulate with expectations of real-time analysis. Thus, an interface between software and MAC controls sampling rate, interval, data reference size, and filtration. This control is extrapolated across various telemetry elements to establish features that define inputs into ML inference models. The inference output from the compute engines triggers actions to be performed within the system (e.g., via software, hardware, etc.). Algorithms and applications monitor filtered output for erroneous events, premature failure detection, and to establish trends for various use-cases. For example, software may be interested in sampling received power for a specific ONT over an extended duration, whereby a higher order of accuracy can be achieved due to the increase in potential sampling points over traditional received signal strength indicator (RSSI) methodologies.

Figure 5:
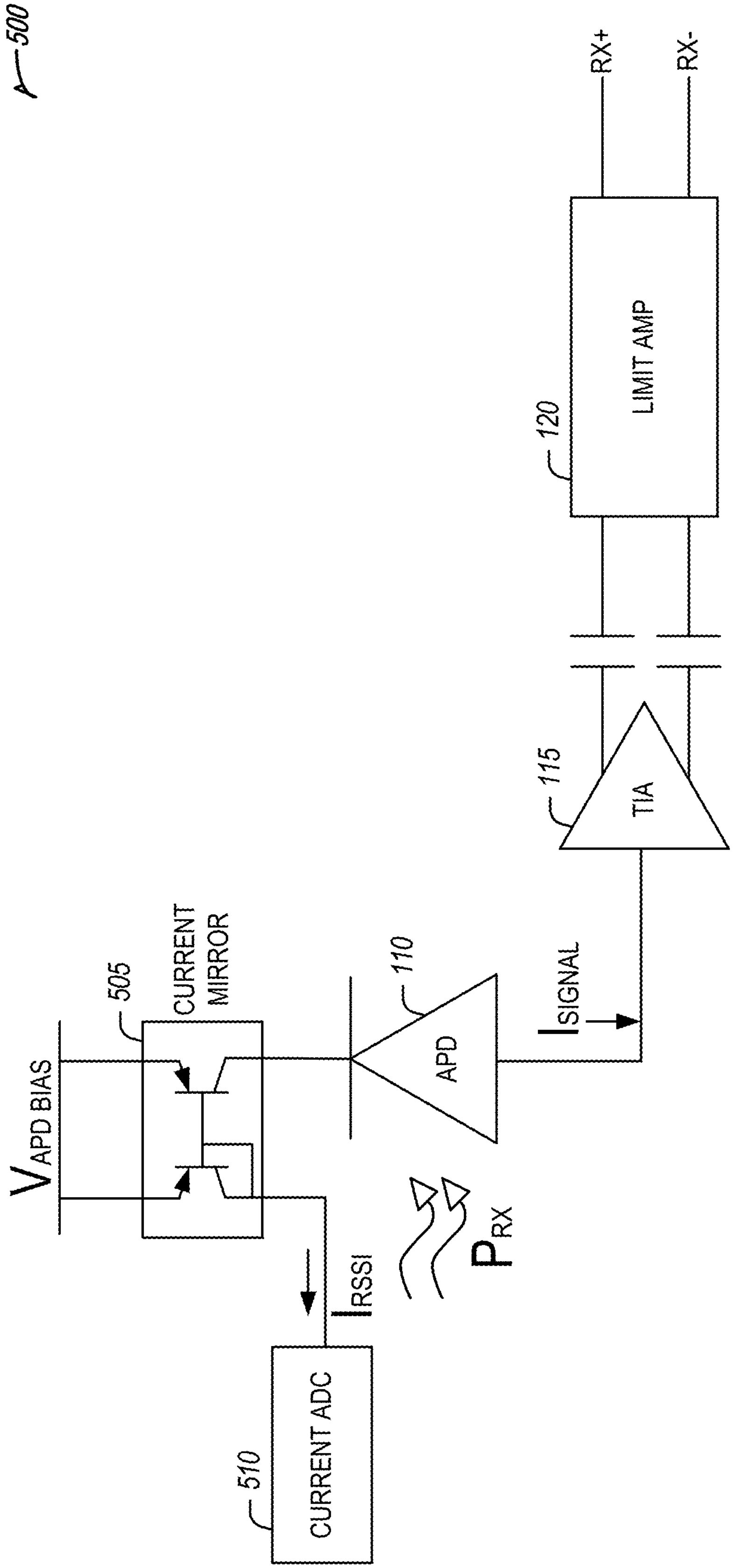
FIG. 5 a circuit diagram of an example of an optical receiver circuit for enhanced rogue monitoring detection and isolation for, according to an embodiment.

FIG. 5 is a circuit diagram of an example of an optical receiver circuit 500 for enhanced rogue monitoring detection and isolation for, according to an embodiment. The collocation of optical front-end including an avalanche photodiode (APD) 110 and a transimpedance amplifier (TIA) 115 including CDR circuitry offers new opportunities to monitor for rogue-like behavior. Historically, this information could not be shared between an optical receiver front-end (e.g., the APD 110) and a CDR device (e.g., the TIA 115). The systems and techniques discussed herein enable detection of rogue-like behavior using the collocated optical front-end and CDR circuitry.

In an example, at the end of a burst, the ADC 110 expects an exponential decaying signal expedited by receiver reset circuitry (e.g., a current mirror 505) that is common-mode in nature. After the reset, a limit amplifier 120 and the CDR circuitry expect a squelched common-mode-only signal from the TIA 115. A conditional rogue flag is raised if data from a current analog-to-digital converter (ADC) 510 indicates presence of a continuous high-confidence bit pattern during a guard window period (e.g., the inter-burst guard time 405 as described in FIG. 4, etc.).

In an example, immediately following the guard window period, an upstream preamble transmission is generated for quick and robust clock recovery. A conditional rogue flag is raised given the presence of a strong optical signal while observing a stream of low confidence decisions based on data from the current ADC 510 during a preamble time window.

The occurrence of either of the example conditions discussed above is communicated in the form of a flag in slow electrically erasable programmable read-only memory (EEPROM) addressing of the module, as a message during the next telemetry window, etc. Indication of a rogue flag does not indicate the actual presence of a rogue transmission, but enables the OLT to make a more fully informed interpretation of the upstream information.

Using the preamble/delimiter probability bits offers insight into troubleshooting instances of rogue-like behavior when the rogue transmissions are well formed bursts with correct framing. Retrieved burst-by-burst telemetry is helpful in detecting, and potentially isolating, ONTs transmitting out of their expected timeslots.

Figure 6:
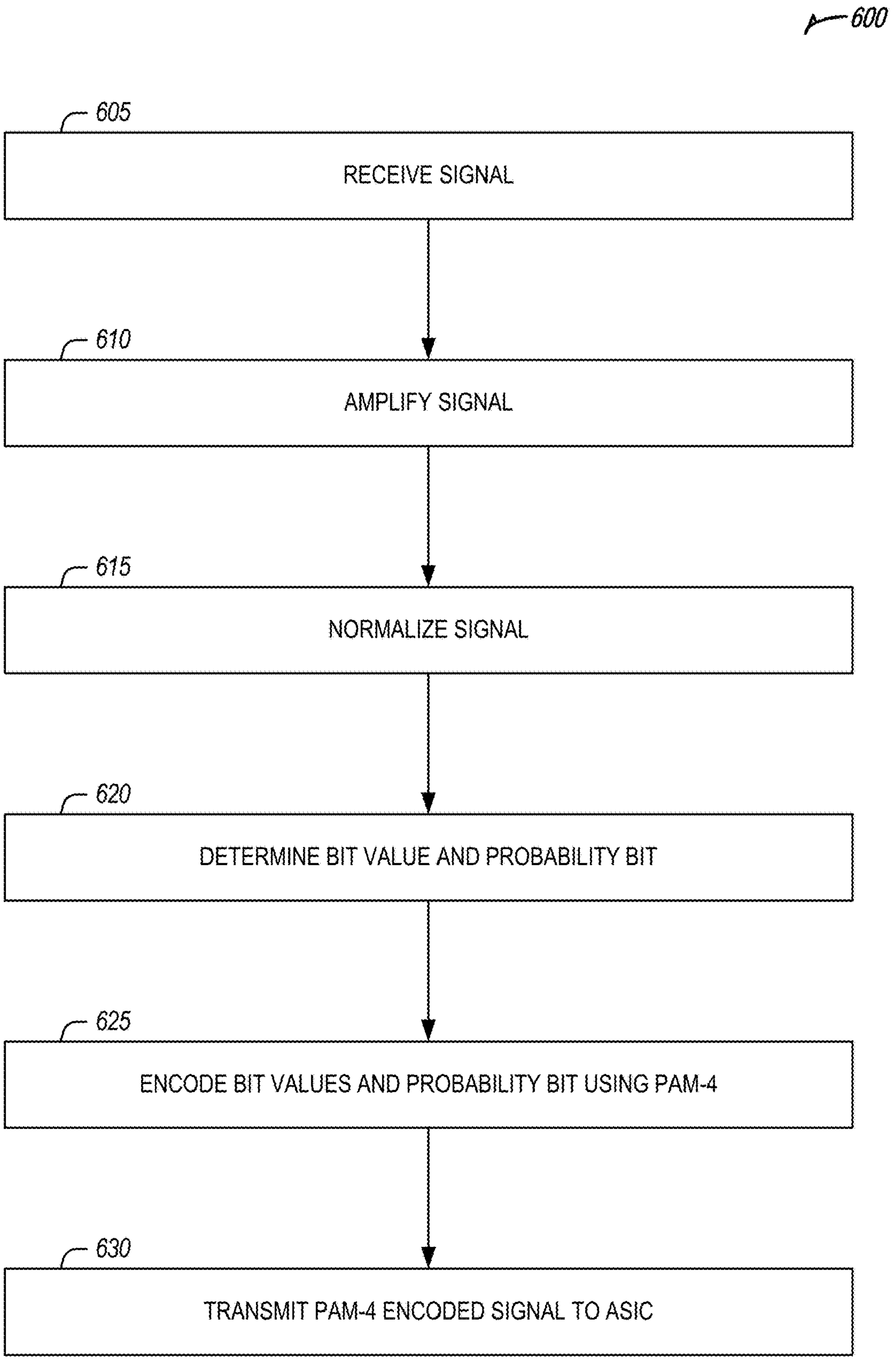
FIG. 6 illustrates an example of a method for, according to an embodiment.

FIG. 6 illustrates an example of a method 600 of using inter-burst guard time for real-time telemetry for, according to an embodiment. The method 600 may provide features as described in FIGS. 1 to 5.

An optical signal is received and converted into an electrical signal (e.g., at operation 605). The electrical signal is amplified through a trans-impedance amplifier to produce an amplified signal (e.g., at operation 610). The amplified signal is normalized using a limit amplifier to generate a normalized signal (e.g., at operation 615). Bit values are determined from the normalized signal and a corresponding probability bit is generated for each bit value using a threshold detector (e.g., at operation 620).

The bit values and the corresponding probability bit are encoded into a four-level pulse-amplitude modulation (PAM-4) signal (e.g., at operation 625). In an example, the PAM-4 signal may include a preamble and delimiter sequence to facilitate alignment and recombination of data streams within the ASIC. In an example, the preamble and delimiter sequence may be duplicated on a probability bit stream of the data streams to ensure channel bonding between a sampled data stream of the data streams and the probability bit stream. In an example, the probability bit stream may be scrambled to guarantee transition density and adherence to consecutive-identical-digit requirements of an optical receiver. In an example, rogue-like behavior may be detected by monitoring characteristics of the electrical signal after a receiver reset and during a preamble transmission and a conditional rogue flag may be raised based on the detection.

The PAM-4 signal is transmitted to an application-specific integrated circuit (ASIC) for data recovery and error correction processing (e.g., at operation 630). In an example, the error correction processing may utilize soft-decision forward error correction (SD-FEC) probability bits. In an example, the PAM-4 signal may be transmitted in a frame with a framing structure comprising a header that includes an error correction field, a type identifier field, a rate identifier field, and an iteration identifier field. In an example, telemetry data may be transmitted to the ASIC via a channel between the ASIC and a PAM-4 modulator during a guard band window between receiver reset pulses present in the normalized signal. In an example, the telemetry data may include at least one of a receive signal level, a clock and data recovery status, phase interpolator values, limit amp gain selection, dispersion monitors, a jitter measurement, or optical time domain reflectometry measurements.

In an example, the normalized signal may be split into a set of odd bits and a set of even bits. A first probability bit for the set of odd bits may be encoded using a PAM-4 modulator to generate an encoded odd probability bit. A second probability bit for the set of even bits may be encoded using the PAM-4 modulator to generate an encoded even probability bit. The encoded odd probability bit may be transmitted to the ASIC via a first traffic lane and the encoded even probability bit may be transmitted to the ASIC via a second traffic lane, the second traffic lane being different from the first traffic lane.

Figure 7:
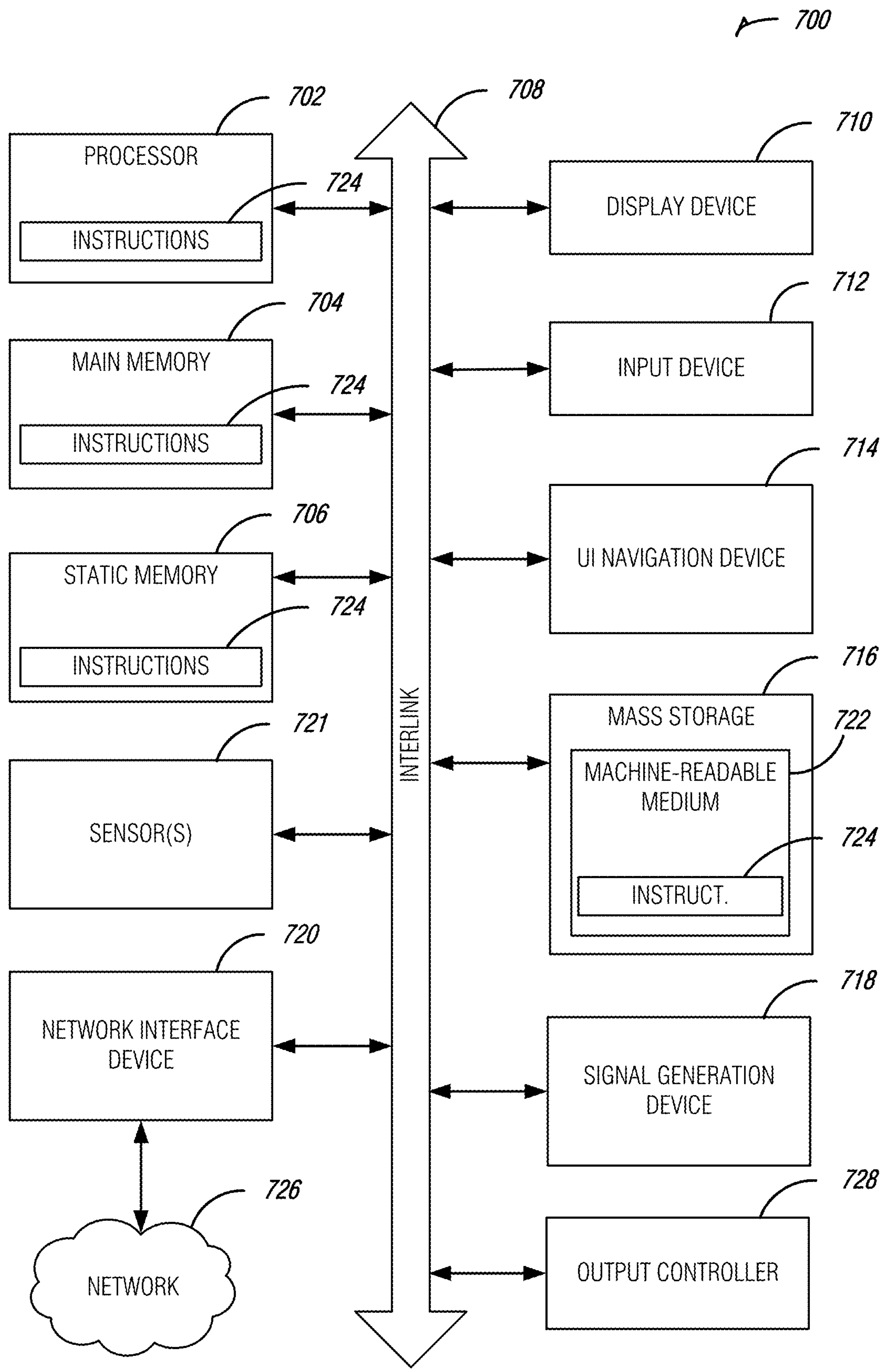
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding or carrying instructions for execution by the machine 700, and includes digital or analog communications signals or other intangible medium to facilitate communication of such software.

ADDITIONAL NOTES & EXAMPLES

Example 1 is a system for pulse amplitude modulated forward error correction comprising: at least one processor; and memory comprising instructions that, when executed by the at least one processor, cause the at least one processor to perform operations to: receive an optical signal and convert the optical signal into an electrical signal; amplify the electrical signal through a trans-impedance amplifier to produce an amplified signal; normalize the amplified signal using a limit amplifier to generate a normalized signal; determine bit values from the normalized signal and generate a corresponding probability bit for each bit value using a threshold detector; encode the bit values and the corresponding probability bit into a four-level pulse-amplitude modulation (PAM-4) signal; and transmit the PAM-4 signal to an application-specific integrated circuit (ASIC) for data recovery and error correction processing.

In Example 2, the subject matter of Example 1 includes, the memory further comprising instructions that, when executed by the at least one processor, cause the at least one processor to perform operations to: split the normalized signal into a set of odd bits and a set of even bits; encode a first probability bit for the set of odd bits using a PAM-4 modulator to generate an encoded odd probability bit; encode a second probability bit for the set of even bits using the PAM-4 modulator to generate an encoded even probability bit; transmit the encoded odd probability bit to the ASIC via a first traffic lane; and transmit the encoded even probability bit to the ASIC via a second traffic lane, the second traffic lane being different from the first traffic lane.

In Example 3, the subject matter of Examples 1-2 wherein, the PAM-4 signal includes a preamble and delimiter sequence to facilitate alignment and recombination of data streams within the ASIC.

In Example 4, the subject matter of Example 3 wherein, the preamble and delimiter sequence is duplicated on a probability bit stream of the data streams to ensure channel bonding between a sampled data stream of the data streams and the probability bit stream.

In Example 5, the subject matter of Example 4 includes, the memory further comprising instructions that, when executed by the at least one processor, cause the at least one processor to perform operations to scramble the probability bit stream to guarantee transition density and adherence to consecutive-identical-digit requirements of an optical receiver.

In Example 6, the subject matter of Examples 4-5 wherein, the PAM-4 signal is transmitted in a frame with a framing structure comprising a header that includes an error correction field, a type identifier field, a rate identifier field, and an iteration identifier field.

In Example 7, the subject matter of Examples 1-6 includes, the memory further comprising instructions that, when executed by the at least one processor, cause the at least one processor to perform operations to: transmit telemetry data to the ASIC via a channel between the ASIC and a PAM-4 modulator during a guard band window between receiver reset pulses present in the normalized signal.

In Example 8, the subject matter of Example 7 wherein, the telemetry data includes at least one of a receive signal level, a clock and data recovery status, phase interpolator values, limit amp gain selection, dispersion monitors, a jitter measurement, or optical time domain reflectometry measurements.

In Example 9, the subject matter of Examples 1-8 wherein, the error correction processing utilizes soft-decision forward error correction (SD-FEC) probability bits.

In Example 10, the subject matter of Examples 1-9 includes, the memory further comprising instructions that, when executed by the at least one processor, cause the at least one processor to perform operations to: detect rogue-like behavior by monitoring characteristics of the electrical signal after a receiver reset and during a preamble transmission; and raise a conditional rogue flag based on the detection.

Example 11 is at least one non-transitory machine-readable medium comprising instructions for pulse amplitude modulated forward error correction that, when executed by at least one processor, cause the at least one processor to perform operations to: receive an optical signal and convert the optical signal into an electrical signal; amplify the electrical signal through a trans-impedance amplifier to produce an amplified signal; normalize the amplified signal using a limit amplifier to generate a normalized signal; determine bit values from the normalized signal and generate a corresponding probability bit for each bit value using a threshold detector; encode the bit values and the corresponding probability bit into a four-level pulse-amplitude modulation (PAM-4) signal; and transmit the PAM-4 signal to an application-specific integrated circuit (ASIC) for data recovery and error correction processing.

In Example 12, the subject matter of Example 11 includes, instructions that, when executed by the at least one processor, cause the at least one processor to perform operations to: split the normalized signal into a set of odd bits and a set of even bits; encode a first probability bit for the set of odd bits using a PAM-4 modulator to generate an encoded odd probability bit; encode a second probability bit for the set of even bits using the PAM-4 modulator to generate an encoded even probability bit; transmit the encoded odd probability bit to the ASIC via a first traffic lane; and transmit the encoded even probability bit to the ASIC via a second traffic lane, the second traffic lane being different from the first traffic lane.

In Example 13, the subject matter of Examples 11-12 wherein, the PAM-4 signal includes a preamble and delimiter sequence to facilitate alignment and recombination of data streams within the ASIC.

In Example 14, the subject matter of Example 13 wherein, the preamble and delimiter sequence is duplicated on a probability bit stream of the data streams to ensure channel bonding between a sampled data stream of the data streams and the probability bit stream.

In Example 15, the subject matter of Example 14 includes, instructions that, when executed by the at least one processor, cause the at least one processor to perform operations to scramble the probability bit stream to guarantee transition density and adherence to consecutive-identical-digit requirements of an optical receiver.

In Example 16, the subject matter of Examples 14-15 wherein, the PAM-4 signal is transmitted in a frame with a framing structure comprising a header that includes an error correction field, a type identifier field, a rate identifier field, and an iteration identifier field.

In Example 17, the subject matter of Examples 11-16 includes, instructions that, when executed by the at least one processor, cause the at least one processor to perform operations to: transmit telemetry data to the ASIC via a channel between the ASIC and a PAM-4 modulator during a guard band window between receiver reset pulses present in the normalized signal.

In Example 18, the subject matter of Example 17 wherein, the telemetry data includes at least one of a receive signal level, a clock and data recovery status, phase interpolator values, limit amp gain selection, dispersion monitors, a jitter measurement, or optical time domain reflectometry measurements.

In Example 19, the subject matter of Examples 11-18 wherein, the error correction processing utilizes soft-decision forward error correction (SD-FEC) probability bits.

In Example 20, the subject matter of Examples 11-19 includes, instructions that, when executed by the at least one processor, cause the at least one processor to perform operations to: detect rogue-like behavior by monitoring characteristics of the electrical signal after a receiver reset and during a preamble transmission; and raise a conditional rogue flag based on the detection.

Example 21 is a method for pulse amplitude modulated forward error correction comprising: receiving an optical signal and converting the optical signal into an electrical signal; amplifying the electrical signal through a trans-impedance amplifier to produce an amplified signal; normalizing the amplified signal using a limit amplifier to generate a normalized signal; determining bit values from the normalized signal and generating a corresponding probability bit for each bit value using a threshold detector; encoding the bit values and the corresponding probability bit into a four-level pulse-amplitude modulation (PAM-4) signal; and transmitting the PAM-4 signal to an application-specific integrated circuit (ASIC) for data recovery and error correction processing.

In Example 22, the subject matter of Example 21 includes, splitting the normalized signal into a set of odd bits and a set of even bits; encoding a first probability bit for the set of odd bits using a PAM-4 modulator to generate an encoded odd probability bit; encoding a second probability bit for the set of even bits using the PAM-4 modulator to generate an encoded even probability bit; transmitting the encoded odd probability bit to the ASIC via a first traffic lane; and transmitting the encoded even probability bit to the ASIC via a second traffic lane, the second traffic lane being different from the first traffic lane.

In Example 23, the subject matter of Examples 21-22 wherein, the PAM-4 signal includes a preamble and delimiter sequence to facilitate alignment and recombination of data streams within the ASIC.

In Example 24, the subject matter of Example 23 wherein, the preamble and delimiter sequence is duplicated on a probability bit stream of the data streams to ensure channel bonding between a sampled data stream of the data streams and the probability bit stream.

In Example 25, the subject matter of Example 24 includes, scrambling the probability bit stream to guarantee transition density and adherence to consecutive-identical-digit requirements of an optical receiver.

In Example 26, the subject matter of Examples 24-25 wherein, the PAM-4 signal is transmitted in a frame with a framing structure comprising a header that includes an error correction field, a type identifier field, a rate identifier field, and an iteration identifier field.

In Example 27, the subject matter of Examples 21-26 includes, transmitting telemetry data to the ASIC via a channel between the ASIC and a PAM-4 modulator during a guard band window between receiver reset pulses present in the normalized signal.

In Example 28, the subject matter of Example 27 wherein, the telemetry data includes at least one of a receive signal level, a clock and data recovery status, phase interpolator values, limit amp gain selection, dispersion monitors, a jitter measurement, or optical time domain reflectometry measurements.

In Example 29, the subject matter of Examples 21-28 wherein, the error correction processing utilizes soft-decision forward error correction (SD-FEC) probability bits.

In Example 30, the subject matter of Examples 21-29 includes, detecting rogue-like behavior by monitoring characteristics of the electrical signal after a receiver reset and during a preamble transmission; and raising a conditional rogue flag based on the detection.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for pulse amplitude modulated forward error correction comprising:

at least one processor; and memory comprising instructions that, when executed by the at least one processor, cause the at least one processor to perform operations to:

receive an optical signal and convert the optical signal into an electrical signal;

amplify the electrical signal through a trans-impedance amplifier to produce an amplified signal;

normalize the amplified signal using a limit amplifier to generate a normalized signal;

determine bit values from the normalized signal and generate a corresponding probability bit for each bit value using a threshold detector;

encode the bit values and the corresponding probability bit into a four-level pulse-amplitude modulation (PAM-4) signal; and transmit the PAM-4 signal to an application-specific integrated circuit (ASIC) for data recovery and error correction processing.

2. The system of claim 1, the memory further comprising instructions that, when executed by the at least one processor, cause the at least one processor to perform operations to:

split the normalized signal into a set of odd bits and a set of even bits;

encode a first probability bit for the set of odd bits using a PAM-4 modulator to generate an encoded odd probability bit;

encode a second probability bit for the set of even bits using the PAM-4 modulator to generate an encoded even probability bit;

transmit the encoded odd probability bit to the ASIC via a first traffic lane; and transmit the encoded even probability bit to the ASIC via a second traffic lane, the second traffic lane being different from the first traffic lane.

3. The system of claim 1, wherein the PAM-4 signal includes a preamble and delimiter sequence to facilitate alignment and recombination of data streams within the ASIC.

4. The system of claim 3, wherein the preamble and delimiter sequence is duplicated on a probability bit stream of the data streams to ensure channel bonding between a sampled data stream of the data streams and the probability bit stream.

5. The system of claim 4, wherein the PAM-4 signal is transmitted in a frame with a framing structure comprising a header that includes an error correction field, a type identifier field, a rate identifier field, and an iteration identifier field.

6. The system of claim 1, the memory further comprising instructions that, when executed by the at least one processor, cause the at least one processor to perform operations to:

transmit telemetry data to the ASIC via a channel between the ASIC and a PAM-4 modulator during a guard band window between receiver reset pulses present in the normalized signal.

7. The system of claim 1, the memory further comprising instructions that, when executed by the at least one processor, cause the at least one processor to perform operations to:

detect rogue-like behavior by monitoring characteristics of the electrical signal after a receiver reset and during a preamble transmission; and raise a conditional rogue flag based on the detection.

8. At least one non-transitory machine-readable medium comprising instructions for pulse amplitude modulated forward error correction that, when executed by at least one processor, cause the at least one processor to perform operations to:

receive an optical signal and convert the optical signal into an electrical signal;

amplify the electrical signal through a trans-impedance amplifier to produce an amplified signal;

normalize the amplified signal using a limit amplifier to generate a normalized signal;

determine bit values from the normalized signal and generate a corresponding probability bit for each bit value using a threshold detector;

encode the bit values and the corresponding probability bit into a four-level pulse-amplitude modulation (PAM-4) signal; and transmit the PAM-4 signal to an application-specific integrated circuit (ASIC) for data recovery and error correction processing.

9. The at least one non-transitory machine-readable medium of claim 8, further comprising instructions that, when executed by the at least one processor, cause the at least one processor to perform operations to:

split the normalized signal into a set of odd bits and a set of even bits;

encode a first probability bit for the set of odd bits using a PAM-4 modulator to generate an encoded odd probability bit;

encode a second probability bit for the set of even bits using the PAM-4 modulator to generate an encoded even probability bit;

transmit the encoded odd probability bit to the ASIC via a first traffic lane; and transmit the encoded even probability bit to the ASIC via a second traffic lane, the second traffic lane being different from the first traffic lane.

10. The at least one non-transitory machine-readable medium of claim 8, wherein the PAM-4 signal includes a preamble and delimiter sequence to facilitate alignment and recombination of data streams within the ASIC.

11. The at least one non-transitory machine-readable medium of claim 10, wherein the preamble and delimiter sequence is duplicated on a probability bit stream of the data streams to ensure channel bonding between a sampled data stream of the data streams and the probability bit stream.

12. The at least one non-transitory machine-readable medium of claim 11, wherein the PAM-4 signal is transmitted in a frame with a framing structure comprising a header that includes an error correction field, a type identifier field, a rate identifier field, and an iteration identifier field.

13. The at least one non-transitory machine-readable medium of claim 8, further comprising instructions that, when executed by the at least one processor, cause the at least one processor to perform operations to:

transmit telemetry data to the ASIC via a channel between the ASIC and a PAM-4 modulator during a guard band window between receiver reset pulses present in the normalized signal.

14. The at least one non-transitory machine-readable medium of claim 8, further comprising instructions that, when executed by the at least one processor, cause the at least one processor to perform operations to:

detect rogue-like behavior by monitoring characteristics of the electrical signal after a receiver reset and during a preamble transmission; and raise a conditional rogue flag based on the detection.

15. A method for pulse amplitude modulated forward error correction comprising:

receiving an optical signal and converting the optical signal into an electrical signal;

amplifying the electrical signal through a trans-impedance amplifier to produce an amplified signal;

normalizing the amplified signal using a limit amplifier to generate a normalized signal;

determining bit values from the normalized signal and generating a corresponding probability bit for each bit value using a threshold detector;

encoding the bit values and the corresponding probability bit into a four-level pulse-amplitude modulation (PAM-4) signal; and transmitting the PAM-4 signal to an application-specific integrated circuit (ASIC) for data recovery and error correction processing.

16. The method of claim 15, further comprising:

splitting the normalized signal into a set of odd bits and a set of even bits;

encoding a first probability bit for the set of odd bits using a PAM-4 modulator to generate an encoded odd probability bit;

encoding a second probability bit for the set of even bits using the PAM-4 modulator to generate an encoded even probability bit;

transmitting the encoded odd probability bit to the ASIC via a first traffic lane; and transmitting the encoded even probability bit to the ASIC via a second traffic lane, the second traffic lane being different from the first traffic lane.

17. The method of claim 15, wherein the PAM-4 signal includes a preamble and delimiter sequence to facilitate alignment and recombination of data streams within the ASIC.

18. The method of claim 17, wherein the preamble and delimiter sequence is duplicated on a probability bit stream of the data streams to ensure channel bonding between a sampled data stream of the data streams and the probability bit stream.

19. The method of claim 18, wherein the PAM-4 signal is transmitted in a frame with a framing structure comprising a header that includes an error correction field, a type identifier field, a rate identifier field, and an iteration identifier field.

20. The method of claim 15, further comprising:

transmitting telemetry data to the ASIC via a channel between the ASIC and a PAM-4 modulator during a guard band window between receiver reset pulses present in the normalized signal.

* * * * *